(12) United States Patent
Chou et al.

(10) Patent No.: US 11,530,900 B2
(45) Date of Patent: Dec. 20, 2022

(54) SIGHTING SYSTEM

(71) Applicants: Sintai Optical (Shenzhen) Co., Ltd., ShenZhen (CN); Asia Optical Co., Inc., Taichung (TW)

(72) Inventors: Hung-Chi Chou, Taichung (TW); Chia-Kan Chang, Taichung (TW); Chia-Chi Tang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 407 days.

(21) Appl. No.: 16/690,222

(22) Filed: Nov. 21, 2019

(65) Prior Publication Data
US 2020/0166308 A1    May 28, 2020

(30) Foreign Application Priority Data
Nov. 28, 2018    (CN) .......................... 201811433530.X (51) Int. Cl.
| | |
|---|---|
| *F41G 1/54* | (2006.01) |
| *F41G 3/08* | (2006.01) |
| *G02B 27/36* | (2006.01) |
| *F41G 1/38* | (2006.01) |

(52) U.S. Cl.
CPC ............... *F41G 1/545* (2013.01); *F41G 1/38* (2013.01); *F41G 3/08* (2013.01); *G02B 27/36* (2013.01)

(58) Field of Classification Search
CPC ....................................................... F41G 1/38
See application file for complete search history.

(56) References Cited

U.S. PATENT DOCUMENTS

| | | | |
|---|---|---|---|
| 5,913,079 A | 6/1999 | Aoyama et al. | |
| 10,337,830 B2 * | 7/2019 | McHale | F41G 1/38 |
| 10,767,962 B2 * | 9/2020 | York | F41G 1/44 |
| 11,255,637 B2 * | 2/2022 | Delz | G01B 7/30 |
| 2007/0234626 A1 | 10/2007 | Murdock et al. | |

(Continued)

FOREIGN PATENT DOCUMENTS

| | | |
|---|---|---|
| CN | 110285710 A | 9/2019 |
| EP | 1748273 A1 | 1/2007 |
| EP | 1804017 A1 | 7/2007 |

*Primary Examiner* — Joshua T Semick
(74) *Attorney, Agent, or Firm* — McClure, Qualey & Rodack, LLP (57) ABSTRACT

A sighting system includes a sight body, a compensating mechanism, a converting unit, a processing unit and an output unit. The sight body is configured to aim an object. The compensating mechanism is disposed on the sight body and includes a base, an adjusting unit and an adjusting cap, wherein the adjusting cap is configured to rotate the adjusting unit with respect to the base. The converting unit is disposed in the compensating mechanism and is configured to obtain rotation information of the adjusting cap, convert the rotation information into an electrical signal and output the electrical signal. The processing unit is configured to receive the electrical signal for obtaining an instant adjusting value of the adjusting cap and to compare the instant adjusting value with a predetermined adjusting value. The output unit is electrically connected to the processing unit for presenting information for correction of bullet impact points.

16 Claims, 6 Drawing Sheets

(56) References Cited

U.S. PATENT DOCUMENTS

| | | |
|---|---|---|
| 2013/0167425 A1 | 7/2013 | Crispin |
| 2015/0247702 A1 | 9/2015 | Davidson et al. |
| 2016/0084616 A1 | 3/2016 | Jahromi |
| 2018/0313633 A1 | 11/2018 | Delz et al. |

* cited by examiner

SIGHTING SYSTEM

BACKGROUND OF THE INVENTION

Field of the Invention

The invention relates to a sighting system, and more particularly to a sighting system provided with a compensating mechanism wherein the fineness of adjustment of the compensating mechanism is capable of being changed.

Description of the Related Art

Generally, a gun is provided with a sight for improving accuracy of shooting. Since a bullet out of the gun is affected by gravity and wind, a conventional sight is usually provided with a windage or elevation compensating mechanism configured to correct bullet impact points.

Figure 1:
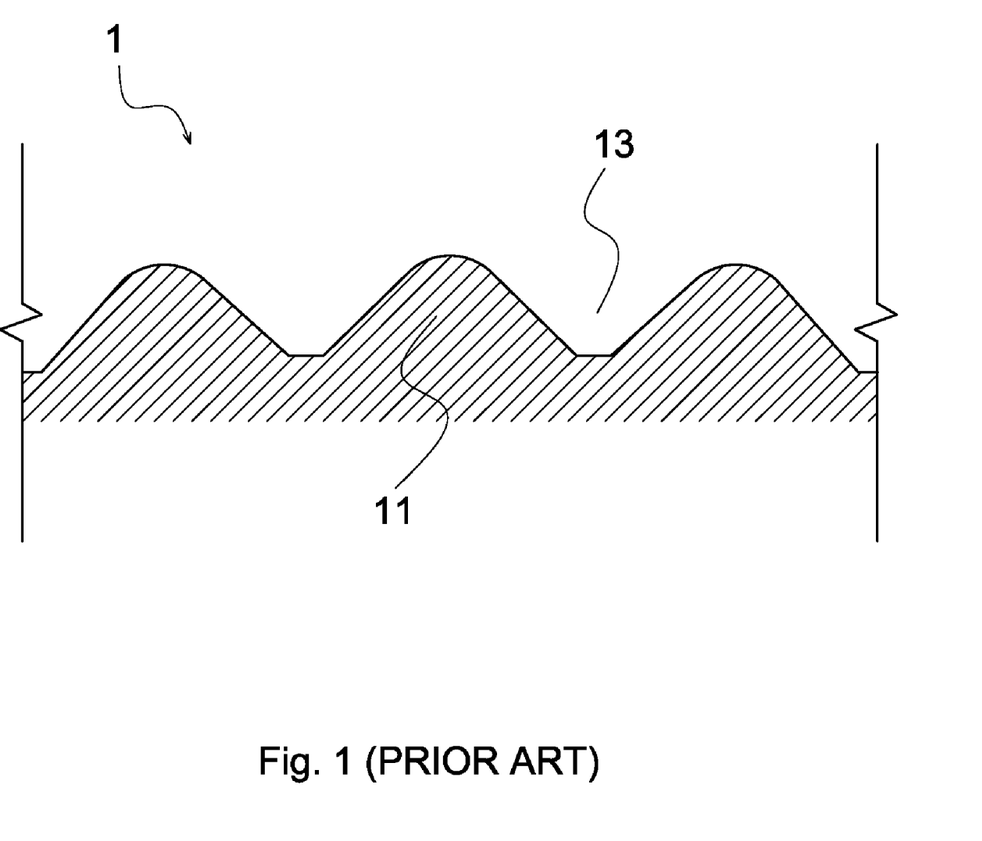
FIG. 1 is a schematic view of a portion of a ring gear of a conventional compensating mechanism.

Referring to FIG. 1, a conventional compensating mechanism (not shown) includes a ring gear 1 which is provided with a plurality of teeth 11 and a plurality of tooth spaces 13. The teeth 11 and the tooth spaces 13 are alternately disposed so as to form a gear-shaped structure. During correction of bullet impact points, the compensating mechanism is operated to move a steel ball (not shown) between the tooth spaces 13, thereby making clicking sound or vibrations (as a sensory feedback to a user). As receiving the sensory feedback, the user is aware of situation of adjustment of the compensating mechanism. When the user operates the compensating mechanism, a movement of the steel ball from a tooth space 13 to the next tooth space 13 is named "adjustment of one click". However, a quantity of the teeth 11 of the ring gear 1 is predetermined, so that an amount of the adjustment of one click is unable to be changed (for example, one click equals 0.25 Minute of Angle (MOA)). In other words, the fineness of adjustment of the compensating mechanism is fixed.

In a condition that the fineness of adjustment is unable to be changed, if the user desires to correct bullet impact points for a near target object, correction of bullet impact points cannot be rapidly finished because amount of adjustment of one click is small (for example, one click equals 0.125 MOA). By contrast, if the user desires to correct bullet impact points for a far target object, correction of bullet impact points cannot be precisely proceeded, because amount of adjustment of one click is large (for example, one click equals 1 MOA). It is inconvenience for the user to operate the compensating mechanism because the fineness of adjustment is unchanged.

When a compensating mechanism with different fineness of adjustment is required, the ring gear of the compensating mechanism is necessarily redesigned to have different quantity of the teeth, and even the entire compensating mechanism is necessarily redesigned. However, if the ring gear is designed to have too many teeth, manufacturing the ring gear will become complicated and costly. Therefore, how to design a compensating mechanism with changeable fineness of adjustment is a significant issue.

BRIEF SUMMARY OF THE INVENTION

The invention provides a sighting system includes a compensating mechanism in which the fineness of adjustment can be changed. Also, the sighting system can provide a digitized feedback to user, so that the user is aware of situation of adjustment of the compensating mechanism.

The sighting system in accordance with an embodiment of the invention includes a sight body, a compensating mechanism, a converting unit, a processing unit and an output unit. The sight body is configured to aim an object. The compensating mechanism is disposed on the sight body and includes a base, an adjusting unit and an adjusting cap, wherein the adjusting cap is configured to rotate the adjusting unit with respect to the base, so as to correct bullet impact points for the sight body. The converting unit is disposed in the compensating mechanism and is configured to obtain rotation information of the adjusting cap, convert the rotation information into an electrical signal and output the electrical signal. The processing unit is configured to receive the electrical signal for obtaining an instant adjusting value of the adjusting cap and compare the instant adjusting value with a predetermined adjusting value. The output unit is electrically connected to the processing unit for presenting information for correction of bullet impact points.

In another embodiment, the processing unit is electrically connected to the converting unit by wire or wireless means.

In yet another embodiment, the output unit is electrically connected to the processing unit by wire or wireless means.

In another embodiment, the output unit includes a display unit configured to display the instant adjusting value, the predetermined adjusting value or a result of judgment for providing a feedback to a user.

In yet another embodiment, the converting unit includes a reference element and a sensing element, and the sensing element is configured to detect a movement of the reference element for obtaining the rotation information of the adjusting cap.

In another embodiment, the rotation information of the adjusting cap is angle or number of rotation.

In yet another embodiment, the adjusting unit includes a rotating shaft and an adjusting screw, the rotating shaft is disposed in the base and is provided with a central hole, the adjusting screw is disposed in the central hole, and the adjusting cap is configured to rotate the rotating shaft and the adjusting screw, so that the adjusting screw is axially moved with respect to the base.

In another embodiment, the reference element is fixed between the adjusting cap and the adjusting unit, and the sensing element is disposed on the adjusting unit, so that the sensing element is rotated and moved with respect to the reference element during a movement of the adjusting unit.

In yet another embodiment, the sensing element is fixed between the adjusting cap and the adjusting unit, and the reference element is disposed on the adjusting unit, so that the reference element is rotated and moved with respect to the sensing element during a movement of the adjusting unit.

In another embodiment, the reference element is a magnet.

In yet another embodiment, the sensing element is a Hall-effect detector.

In another embodiment, the sighting system further includes an input unit electrically connected to the processing unit by wire or wireless means.

In yet another embodiment, the input unit is configured to input the predetermined adjusting value.

In another embodiment, wherein the input unit is configured to adjust fineness of adjustment of the compensating mechanism.

In yet another embodiment, the sighting system further includes a distance measuring device electrically connected to the processing unit by wire or wireless means, wherein the processing unit is configured to receive a measuring signal outputted by the distance measuring device, calculate and output the predetermined adjusting value and control the display unit to display the predetermined adjusting value.

In another embodiment, the sighting system further includes a wind-speed measuring device electrically connected to the processing unit by wire or wireless means, wherein the processing unit is configured to receive a measuring signal outputted by the wind-speed measuring device, calculate and output the predetermined adjusting value and control the display unit to display the predetermined adjusting value.

In yet another embodiment, the sight body includes an inner lens barrel and an outer lens barrel, the inner lens barrel is disposed in the outer lens barrel and includes a plurality of lenses, the lenses constitute an optical axis, the base is disposed on the outer lens barrel, the adjusting unit is placed against the inner lens barrel, and the adjusting cap is configured to rotate the adjusting unit with respect to the base, so as to adjust the optical axis.

In another embodiment, information of correction of bullet impact point includes the rotation information of the adjusting cap and adjusting information of the optical axis.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 2:
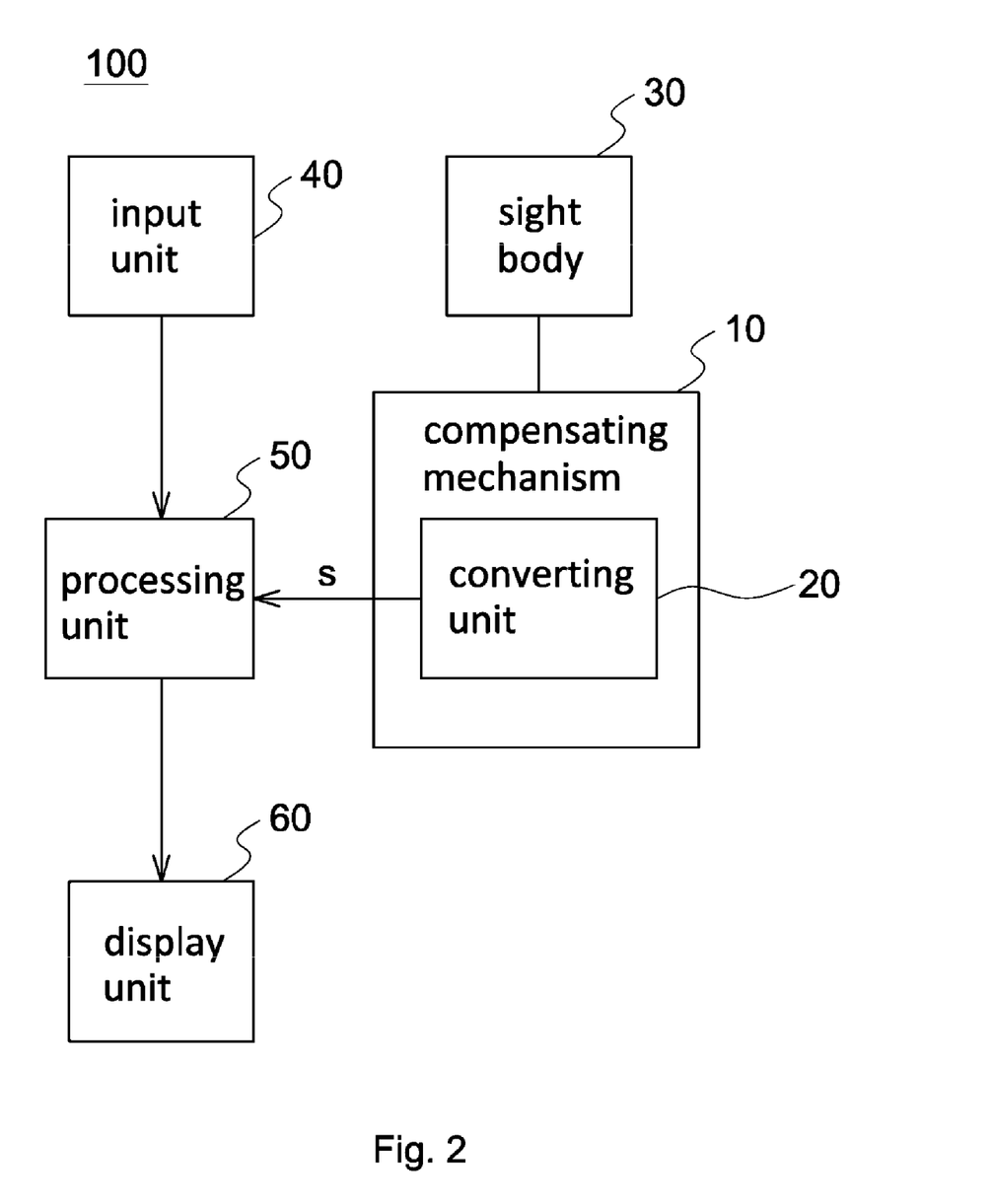
FIG. 2 is a block diagram of a sighting system in accordance with an embodiment of the invention.

Referring to FIG. 2, a sighting system 100 in accordance with an embodiment of the invention includes a sight body 30, a compensating mechanism 10, a converting unit 20, an input unit 40, a processing unit 50 and a display unit 60. The compensating mechanism 10 has no conventional gear-shaped structure, so as to avoid the problem that the fineness of adjustment is unable to be changed. In operation, however, the compensating mechanism 10 without the gear-shaped structure produces no sensory feedback (clicking sound or vibration), so that the user cannot determine whether correction of bullet impact points is finished. Therefore, the sighting system 100 of the invention provides a digitized feedback to the user. The user inputs a target value through the input unit 40 and operates the compensating mechanism 10 to adjust the sight body 30 for correcting the bullet impact points. During correction of bullet impact points, the processing unit 20 judges whether an adjusting amount of the compensating mechanism 10 reaches the target value according to an electrical signal S outputted by the converting unit 20. The user receives a feedback though an output unit (e.g. a display unit 60) for being aware of a result of the correction of bullet impact points, so as to determine whether operation of the compensating mechanism 10 is still required. It is worth noting that if the user determines to continue the operation of the compensating mechanism 10, then the user can change the fineness of adjustment of the compensating mechanism 10 according to a difference between the target value and the adjusting amount of the compensating mechanism 10.

Figure 5:
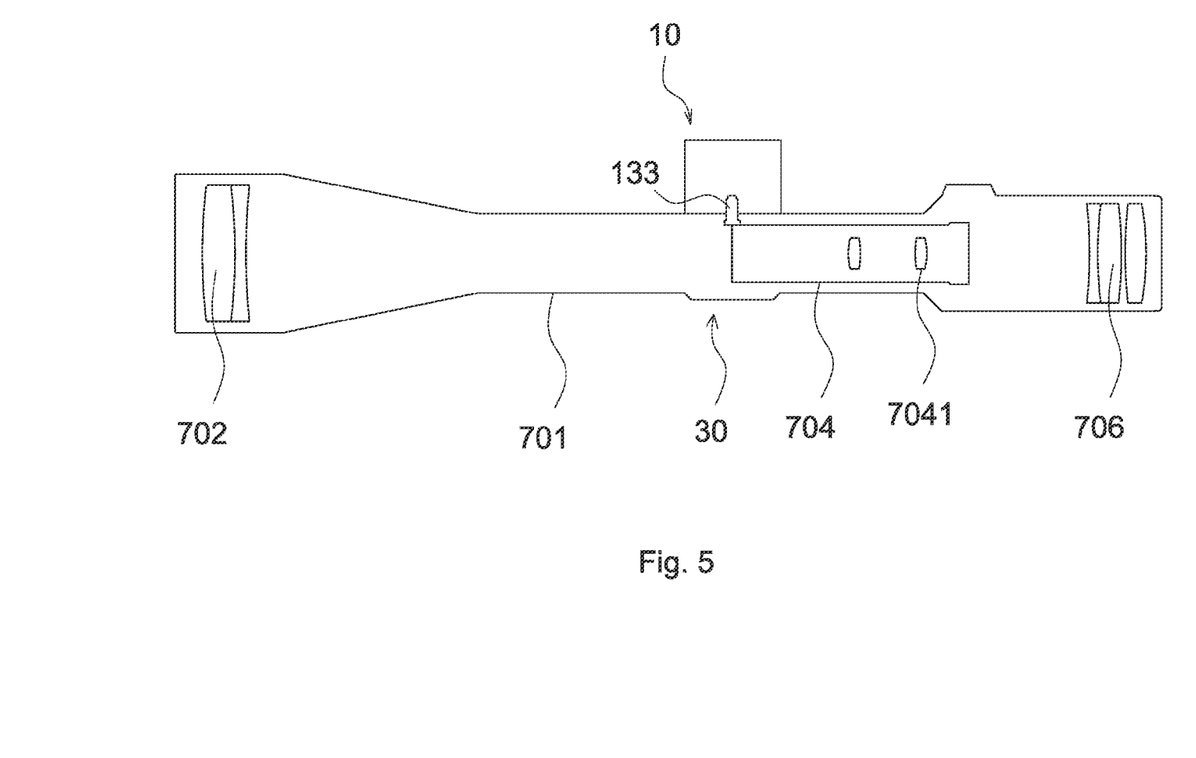
FIG. 5 is a schematic view showing the structure of the sight body and the compensating mechanism of FIG. 1.

The Referring to FIG. 5, the sight body 30 is configured to aim an object (not shown) and includes an outer lens barrel 701, an objective lens unit 702, an eyepiece unit 706, an inner lens barrel 704 and an elastic element (not shown). The outer lens barrel 701 has a frontal portion and a rear portion. The objective lens unit 702 is connected to the frontal portion and is configured to receive a light beam (not shown) emitted by the object. The eyepiece unit 706 is connected to the rear portion. The inner lens barrel 704 is disposed in the outer lens barrel 701 and between the objective lens unit 702 and the eyepiece unit 706 as well as includes a plurality of lenses 7041, wherein the objective lens unit 702, the inner lens barrel 704 and the eyepiece unit 706 constitute an optical axis (not shown). In operation, the light beam passing through the objective lens unit 702 passes through the inner lens barrel 704, so as to form an image of the object. The image of the object can be observed through the eyepiece unit 706. The elastic element is disposed in the outer lens barrel and is placed against the inner lens barrel.

In another embodiment, the sighting system 100 further includes an image sensor (not shown). The image sensor is disposed between the inner lens barrel and the eyepiece unit, is configured to receive the light beam passing through the objective lens unit and the inner lens barrel for obtaining an optical signal corresponding to the image of the object, and is electrically connected to the display unit 60. The image of the object that is displayed in the display unit 60 can be observed through the eyepiece unit.

Figure 3:
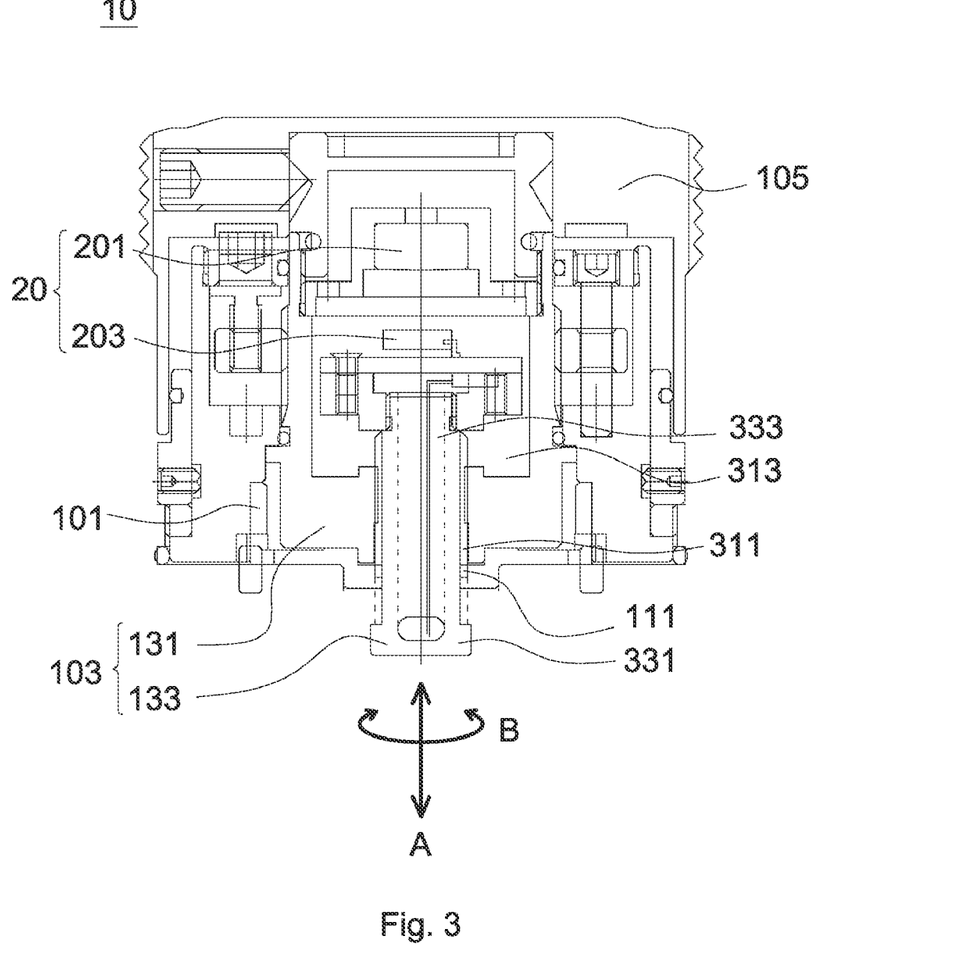
FIG. 3 is a schematic view of a compensating mechanism of FIG. 2.

Referring to FIG. 3, the compensating mechanism 10 includes a base 101, an adjusting unit 103 and an adjusting cap 105. The base 101 is fixed on the outer lens barrel and has an adjusting hole 111. The adjusting unit 103 includes a rotating shaft 131 and an adjusting screw 133, wherein the rotating shaft 131 is disposed in the base 101 and is provided with a central hole 311 and an accommodating space 313. The adjusting screw 133 is disposed in the central hole 311 and has a first end 331 and a second end 333. The first end 331 extends from the adjusting hole 111 of the base 101, is penetrated through the outer lens barrel and is placed against the inner lens barrel. The second end 333 extends into the accommodating space 313 in a direction away from the outer lens barrel. The adjusting cap 105 is connected to the rotating shaft 131 and is configured to rotate the rotating shaft 131 and the adjusting screw 133. The adjusting hole 111 has an inner cylindrical wall, and the inner cylindrical wall is provided with inner threads (not shown). The adjusting screw 133 has an outer cylindrical wall, and the outer cylindrical wall is provided with outer threads (not shown). The outer threads are configured to engage with the inner threads. In such arrangement, the rotating shaft 131 and the adjusting screw 133 are rotated as indicated by arrows B during rotation of the adjusting cap 105, so that the adjusting screw 133 is axially moved with respect to the base 101 as indicated by arrows A. As shown in FIG. 3, when the adjusting unit 103 is rotated, the rotating shaft 131 is rotated but is not axially moved with respect to the base 101 because the rotating shaft 131 is restricted in an axial direction of the compensating mechanism 10 by the base 101. It is understood that the arrangement of all the elements of the compensating mechanism shown in FIG. 3 is exemplary and only for illustrative purposes, and the invention is not limited thereto. In another embodiment, the rotating shaft 131 is rotated and axially moved with respect to the base 101 because the rotating shaft 131 is not restricted by the base 101.

In the present embodiment, the compensating mechanism 10 is an elevation compensating mechanism or windage compensating mechanism, wherein the elevation compensating mechanism is usually disposed on an upper side of the sight body 30, and the windage compensating mechanism is usually disposed on a left or right side of the sight body 30.

As shown in FIG. 3, the converting unit 20 includes a reference element 201 and a sensing element 203, wherein the reference element 201 is fixed between the adjusting cap 105 and the adjusting unit 103. The sensing element 203 is disposed in the accommodating space 313 of the adjusting unit 103, is preferably fixed on the second end 333 of the adjusting screw 133 so that the sensing element 203 is rotated and moved together with the adjusting screw 133 as indicated by arrows A and B with respect to the reference element 201 during a movement of the adjusting unit 103, and is configured to detect a movement of the reference element 201 for obtaining rotation information (e.g. angle or number of rotation) of the adjusting cap 105. In the present embodiment, the reference element 201 is a magnet, and the sensing element 203 is a Hall-effect detector.

In the present embodiment, the input unit 40 is a touch-tone keypad or touch screen, the processing unit 50 is a micro control unit (MCU), and the display unit 60 is a liquid crystal display (LCD) or organic light-emitting diode (OLED).

During operation, the user inputs a predetermined adjusting value (e.g. 4 Minute of Angle (MOA)) to the processing unit 50 through the input unit 40 and rotates the adjusting unit 103 through the adjusting cap 105, so that the adjusting screw 133 is axially moved with respect to the base 101 for adjusting the optical axis. During the movement of the adjusting screw 133, the sensing element 203 fixed on the second end 333 is rotated and moved with respect to the reference element 201. In other words, the sensing element 203 can detect the movement of the reference element 201 for obtaining the rotation information of the adjusting cap 105, and converts the rotation information of the adjusting cap 105 into the electric signal S. The processing unit 50 receives and processes the electric signal S for obtaining an instant adjusting value (e.g. 0.5 MOA) of the adjusting cap 105, and compares the instant adjusting value with the predetermined adjusting value, so as to judge whether correction of bullet impact points is finished. Besides, the processing unit 50 controls the display unit 60 to display the instant adjusting value, the predetermined adjusting value and a result of judgment for user's observation. Then, the user determines whether the correction of bullet impact points is still required according to the result of judgment. In the present embodiment, the way to present the result of judgment can be, for example, changing a blinking frequency of number or symbol displayed by the display unit 60 or changing a color of number or symbol displayed by the display unit 60. In the present embodiment, information of correction of bullet impact points includes the rotation information of the adjusting cap and adjusting information of the optical axis.

It is worth noting that since the fineness of adjustment of the compensating mechanism 10 can be changed, the user can increase or decrease the fineness of adjustment of the compensating mechanism 10 according to a difference between the instant adjusting value and the predetermined adjusting value. For example, the predetermined adjusting value inputted by the user equals 4.75 MOA. When the instant adjusting value equals 0 MOA, the user adjusts the compensating mechanism 10 to change the instant adjusting value in an amount of 1 MOA for each variation (coarse adjustment) until the instant adjusting value equals 4 MOA. Then, the user adjusts the compensating mechanism 10 to change the instant adjusting value in an amount of 0.25 MOA for each variation (fine adjustment) until the instant adjusting value equals 4.75 MOA. It is understood that when the instant adjusting value equals 4 MOA, the user can adjust the compensating mechanism 10 in an amount of 0.5 MOA until the instant adjusting value equals 4.5 MOA, and then the user adjusts the compensating mechanism 10 in an amount of 0.25 MOA until the instant adjusting value equals 4.75 MOA. It is also understood that if the predetermined adjusting value inputted by the user equals 6.225 MOA, then the user can adjust the compensating mechanism 10 in an amount of 6 MOA and a further amount of 0.225 MOA (nonstandard or uncommon adjustment), so as to precisely and rapidly adjust the instant adjusting value to 6.225 MOA. When the instant adjusting value reaches 6.225 MOA, the correction of bullet impact points is finished. In brief, the user can seamlessly change the fineness of adjustment of the compensating mechanism 10 for precisely and rapidly finishing the correction of bullet impact points.

In the present embodiment, the user manually changes the fineness of adjustment of the compensating mechanism 10. In another embodiment, the user changes the fineness of adjustment of the compensating mechanism 10 by inputting the desired fineness of adjustment through the input unit 40 so that the compensating mechanism 10 can control the processing unit 50 accordingly.

In the above description, "Minute of Angle (MOA)" is used as a unit of the adjusting value. However, it is understood that other common units (e.g. milliradian (MRAD) or MIL) can be also used as the unit of the adjusting value.

Figure 6:
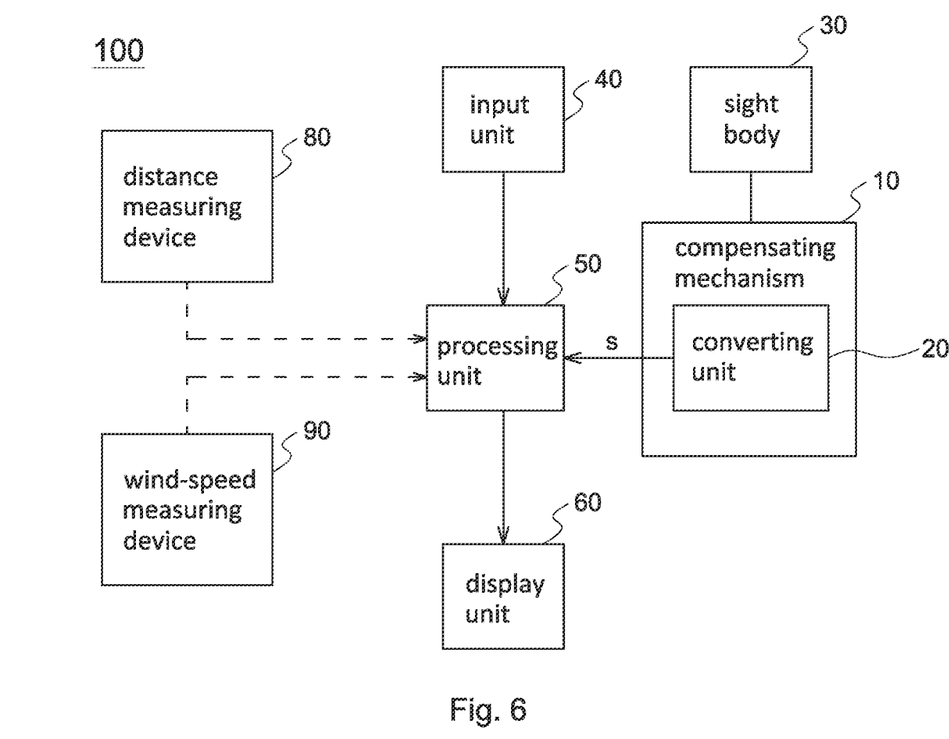
FIG. 6 is a block diagram of a sighting system in accordance with an embodiment of the invention.

In another embodiment, the sighting system 100 further includes a distance measuring device 80 or a wind-speed measuring device 90 as shown in FIG. 6. The distance measuring device 80 or the wind-speed measuring device 90 is electrically connected to the processing unit 50 by wire or wireless means, so that the user do not need to manually input the predetermined adjusting value. During operation, the processing unit 50 calculates the predetermined adjusting value according to a measuring value outputted by the distance measuring device 80 or the wind-speed measuring device 90 and controls the display unit 60 to display the predetermined adjusting value. Then, the user can increase or decrease the fineness of adjustment of the compensating mechanism 10 as described above.

Figure 4:
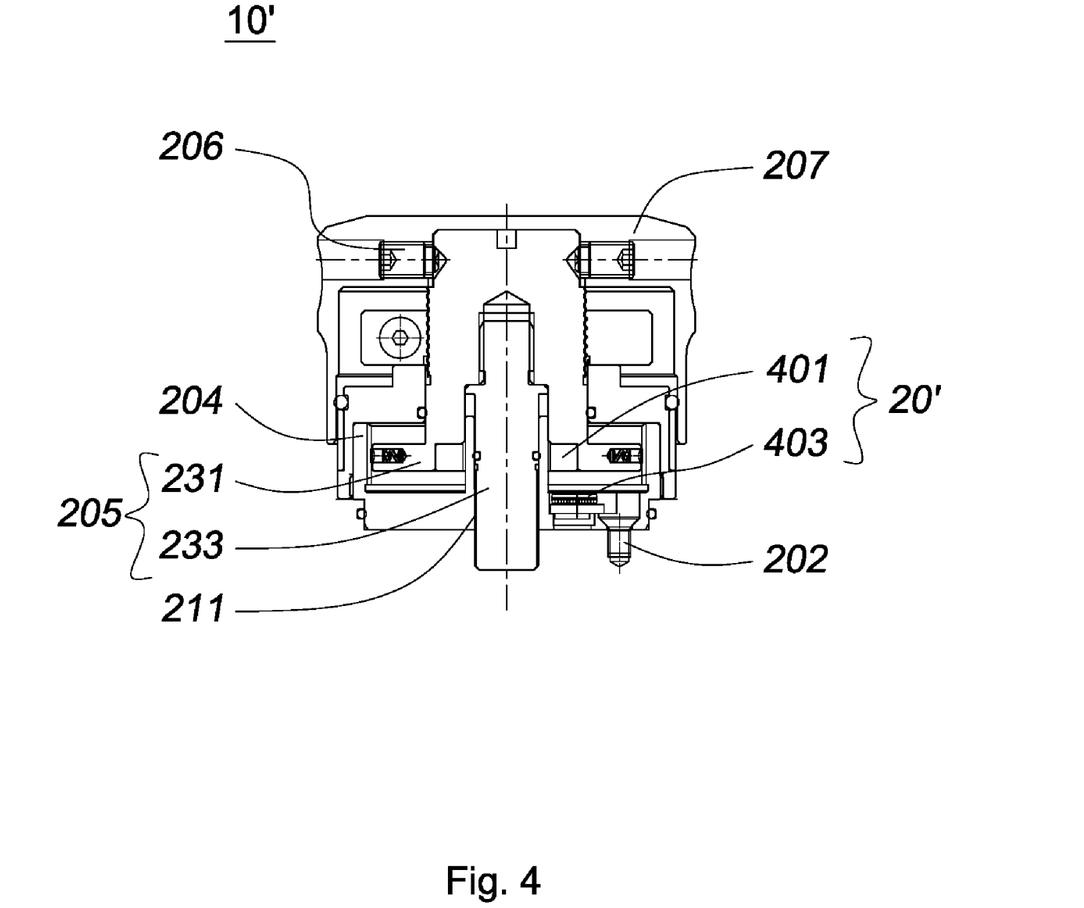
FIG. 4 is a schematic view of a compensating mechanism of a sighting system in accordance with another embodiment of the invention.

Referring to FIG. 4, a sighting system in accordance with another embodiment of the invention includes a sight body (not shown), a compensating mechanism 10', a converting unit 20', an input unit (not shown), a processing unit (not shown) and a display unit (not shown). The compensating mechanism 10' includes a base 204, an adjusting unit 205 and an adjusting cap 207. The base 204 has an adjusting hole 211 and is fixed on an outer lens barrel of the sight body by a fixing screw 202. The adjusting unit 205 includes a rotating shaft 231 and an adjusting screw 233, wherein the rotating shaft 231 is disposed in the base 204 and is provided with a central hole. The adjusting screw 233 is disposed in the central hole, is penetrated through the adjusting hole 211 and is placed against an inner lens barrel of the sight body. The adjusting cap 207 is connected to the rotating shaft 231 by a fixing element 206 and is configured to rotate the rotating shaft 231 and the adjusting screw 233. In such arrangement, the rotating shaft 231 and the adjusting screw 233 are rotated during rotation of the adjusting cap 207, so that the adjusting screw 233 is axially moved with respect to the base 204. As shown in FIG. 4, when the adjusting unit 205 is rotated, the rotating shaft 231 and the adjusting screw 233 are rotated and axially moved with respect to the base 204 because a space is provided between the rotating shaft 231 and the base 204 in an axial direction of the compensating mechanism 10'. It is understood that the arrangement of all the elements of the compensating mechanism shown in FIG. 4 is exemplary and only for illustrative purposes, and the invention is not limited thereto. In another embodiment, the rotating shaft 231 is rotated but is not axially moved with respect to the base 204 because the rotating shaft 231 is restricted by the base 204 in the axial direction. The converting unit 20' includes a reference element 401 and a sensing element 403, wherein the reference element 401 is disposed on the adjusting unit 205 and is preferably disposed on the rotating shaft 231. In the present embodiment, the reference element 401 is a ring-shaped magnet. The sensing element 403 is disposed on the base 204, is fixed between the adjusting cap 207 and the adjusting unit 205 and is configured to detect a movement of the reference element 401 for obtaining rotation information (e.g. angle or number of rotation) of the adjusting cap 207. In brief, the difference between the compensating mechanism 10 of FIG. 3 and the compensating mechanism 10' of FIG. 4 is the arrangement of the sensing element and the reference element of the converting unit. In the arrangement of the converting unit 20, the sensing element 203 and the reference element 201 are arranged coaxially. However, in the arrangement of the converting unit 20', the sensing element 403 and the reference element 401 are not arranged coaxially. The arrangement of other elements and operation of this embodiment are similar to those of the embodiment described above, and therefore the descriptions thereof are omitted.

As described, no gear-shaped structure is included in the compensating mechanism 10 of the invention. Therefore, the fineness of adjustment of the compensating mechanism 10 can be changed seamlessly and continuously, the structure of the compensating mechanism 10 can be simplified, the design cost can be reduced, the design becomes easier, and the assembly of the compensating mechanism 10 is simplified. Further, with converting unit 20 and the processing unit 50, the sighting system 100 of the invention can provide the digitized feedback to the user. Comparing to the conventional sensory feedback (e.g. clicking sound or vibrations), the invention is less liable to faulty judgment and operation by a user.

What is claimed is:

1. A sighting system, comprising:
a sight body configured to aim an object;
a compensating mechanism disposed on the sight body and comprising a base, an adjusting unit and an adjusting cap, wherein the adjusting cap is configured to rotate the adjusting unit with respect to the base, so as to correct bullet impact points for the sight body;
a converting unit disposed in the compensating mechanism and configured to obtain rotation information of the adjusting cap, convert the rotation information into an electrical signal and output the electrical signal;
a processing unit configured to receive and process the electrical signal for obtaining an instant adjusting value of the adjusting cap and to compare the instant adjusting value with a predetermined adjusting value;
an output unit electrically connected to the processing unit for presenting information for correction of bullet impact points;
an input unit electrically connected to the processing unit by wire or wireless means, to change fineness of adjustment of the compensating mechanism as displayed on the output unit.

2. The sighting system as claimed in claim 1, wherein the processing unit is electrically connected to the converting unit by wire or wireless means.

3. The sighting system as claimed in claim 1, wherein the output unit is electrically connected to the processing unit by wire or wireless means.

4. The sighting system as claimed in claim 3, wherein the output unit comprises a display unit configured to display the instant adjusting value, the predetermined adjusting value or a result of judgment for providing a feedback to a user.

5. The sighting system as claimed in claim 1, wherein the converting unit comprises a reference element and a sensing element, and the sensing element is configured to detect a movement of the reference element for obtaining the rotation information of the adjusting cap.

6. The sighting system as claimed in claim 5, wherein the rotation information of the adjusting cap is angle or number of rotation.

7. The sighting system as claimed in claim 5, wherein the adjusting unit comprises a rotating shaft and an adjusting screw, the rotating shaft is disposed in the base and is provided with a central hole, the adjusting screw is disposed in the central hole, and the adjusting cap is configured to rotate the rotating shaft and the adjusting screw, so that the adjusting screw is axially moved with respect to the base.

8. The sighting system as claimed in claim 7, wherein the reference element is fixed between the adjusting cap and the adjusting unit, and the sensing element is disposed on the adjusting unit, so that the sensing element is rotated and moved with respect to the reference element during a movement of the adjusting unit.

9. The sighting system as claimed in claim 7, wherein the sensing element is fixed between the adjusting cap and the adjusting unit, and the reference element is disposed on the adjusting unit, so that the reference element is rotated and moved with respect to the sensing element during a movement of the adjusting unit.

10. The sighting system as claimed in claim 5, wherein the reference element is a magnet.

11. The sighting system as claimed in claim 5, wherein the sensing element is a Hall-effect detector.

12. The sighting system as claimed in claim 1, wherein the input unit is configured to input the predetermined adjusting value.

13. The sighting system as claimed in claim 1, further comprising a distance measuring device electrically connected to the processing unit by wire or wireless means, wherein the processing unit is configured to receive a measuring signal outputted by the distance measuring device, calculate and output the predetermined adjusting value and control the display unit to display the predetermined adjusting value.

14. The sighting system as claimed in claim 1, further comprising a wind-speed measuring device electrically connected to the processing unit by wire or wireless means, wherein the processing unit is configured to receive a measuring signal outputted by the wind-speed measuring device, calculate and output the predetermined adjusting value and control the display unit to display the predetermined adjusting value.

15. The sighting system as claimed in claim 1, wherein the sight body comprises an inner lens barrel and an outer lens barrel, the inner lens barrel is disposed in the outer lens barrel and comprises a plurality of lenses, the lenses constitute an optical axis, the base is disposed on the outer lens barrel, the adjusting unit is placed against the inner lens barrel, and the adjusting cap is configured to rotate the adjusting unit with respect to the base, so as to adjust the optical axis.

16. The sighting system as claimed in claim 15, wherein information of correction of bullet impact point comprises the rotation information of the adjusting cap and adjusting information of the optical axis.

\* \* \* \* \*